(12) United States Patent
Bobbitt

(10) Patent No.: US 6,940,979 B1
(45) Date of Patent: Sep. 6, 2005

(54) MANAGEMENT OF CERTIFICATES FOR PUBLIC KEY INFRASTRUCTURE

(75) Inventor: Michael A. Bobbitt, Munster (CA)

(73) Assignee: Nortel Networks Limited, St. Laurent (CA)

( * ) Notice: Subject to any disclaimer, the term of this patent is extended or adjusted under 35 U.S.C. 154(b) by 848 days.

(21) Appl. No.: 09/708,662

(22) Filed: Nov. 9, 2000

(51) Int. Cl.[7] .................................................. H04I 9/16
(52) U.S. Cl. ...................................... 380/277; 713/175
(58) Field of Search .......................... 380/277; 713/175, 713/156, 158

(56) References Cited

U.S. PATENT DOCUMENTS

| | | | | |
|---|---|---|---|---|
| 5,774,552 A | * | 6/1998 | Grimmer | 713/156 |
| 6,044,350 A | * | 3/2000 | Weiant et al. | 705/1 |
| 6,055,636 A | * | 4/2000 | Hillier et al. | 713/200 |

OTHER PUBLICATIONS

Draft Revised ITU-T Recommendation X.509 | ISO/IEC 9594-8. "Information Technology—Open Systems Interconnection—The Directory: Public-Key and Attribute Certificate Frameworks."; .

Housley, R., W. Ford, W. Polk, and D. Solo. "Internet X.509 Public Key Infrastructure Certificate and CRL Profile." Internet Request for Comments 2459. (Jan. 1999).

Adams, C and S. Farrell. "Internet X.509 Public Key Infrastructure Certificate Management Protocols." Internet Request for Comments 2510. (Mar. 1999).

* cited by examiner

*Primary Examiner*—Gilberto Barrón, Jr.
*Assistant Examiner*—Andrew Nalven

(57) ABSTRACT

Management of ciphertext devaluation in public key infrastructure is addressed by providing system and method using a certificate having a validity dependent on the amount of ciphertext associated with the certificate, i.e. a ciphertext limited certificate (CLC). Thus when the amount of ciphertext reaches or exceeds a predetermined value, the certificate is invalid. The CCE may be expressed as a non critical extension to a X.509 certificate to allow for interoperability with conventional validity conditions based on validity period or revocation. Ciphertext limited certificates may be implemented in an X.509 standard environment based on a method of assigning and determining a certificate ciphertext entitlement (CCE), calculating a generated Ciphertext index (CGI) and performing a CCE threshold detection, and when the GCI reaches or exceeds the CCE, causing a key update, e.g. a rollover of the certificate. Assurance levels may be set based on assigning different CCE default values.

23 Claims, 2 Drawing Sheets

MANAGEMENT OF CERTIFICATES FOR PUBLIC KEY INFRASTRUCTURE

FIELD OF THE INVENTION

This invention relates to management of certificates for public key infrastructure (PKI), and in particular relates to managing cyphertext devaluation.

BACKGROUND OF THE INVENTION

Public key infrastructure (PKI) provides the basis for managing various public keys that are used to provide network security through encryption and digital signatures. PKI provides a security architecture using digital certificates, public key cryptography, and certificate authorities.

A digital certificate, usually issued by a trusted entity called a certificate authority, or policy authority, contains secure information that can be used to verify its owners identity. PKI and Certificates are governed by standards, for examples as discussed in the following references relating to the X.509 framework:

Draft Reviewed ITU-T Recommendation X.509 | ISO/IEC 9594-8. "Information Technology—Open Systems Interconnection-The Directory: Public-Key And Attribute Certificate Frames.";

Housley, R., W. Ford, W. Polk, and D. Solo. "Internet X.509 Public Key Infrastructure Certificate and CRL Profile." Internet Request for Comments 2459. (January 1999);

Adams, C and S. Farrell. "Internet X.509 Public Key Infrastructure Certificate Management Protocols." Internet Request for Comments 2510. (March 1999).

The conditions for validity of a certificate are set by the certificate authority. Due to the nature of current PKI implementations, a single key or certificate is invalid only for a given set of circumstances. A previously valid X.509v3 certificate will only be considered invalid as a result of a change in either of two factors:

Certificate validity period.
Certificate revocation

In the first case, certificates are deemed invalid if they are being referenced outside the period of time between the "Not Valid Before" and the "Not Valid After" times stipulated in the "Validity" extension. This validity period is set by the issuing authority, and is typically the same value for all subjects, regardless of their cryptographic conduct.

In the second case, certificates that have been revoked are no longer considered valid. The certificate subject commonly requests revocation when the certificate is known or suspected to have been compromised. Unfortunately, the subject is not always in a position to know that their certificate has been compromised.

The union of these two situations is the current set of circumstances where an otherwise valid certificate will be deemed valid, and will not be used.

However, this set does take into consideration the volume of information protected by a given key. This factor can be critical in determining the useful lifetime of an encryption key pair.

The encryption key pair consists of the public encryption certificate and the private decryption key. The useful lifetime of an encryption key pair is inversely proportional to the amount of data protected by the corresponding provide decryption key.

As the cryptographic use of a public encryption certificate increases, several additional factors must be considered. The more a public encryption certificate is used to encrypt, the more ciphertext exists corresponding to the encryption key pair. With more information protected by a single provide decryption key, the cumulative value of that information to unintended recipients is likely to increase. As the value of the information protected by a private decryption key increases, that key will become a more tempting target for compromise. As the private decryption key becomes a more tempting target, the risk of its compromise will increase. As the risk of compromise increases, the security of the data it protects decreases. Therefore the more an encryption key pair is used, the less protection it affords its ciphertext. Additionally, if compromised, the private decryption key will be able to expose a greater amount of ciphertext to unintended recipients.

Put together, these factors mean that every time an encryption key pair is used, the risk of compromise and the amount of data put at risk increases. This effect is referred to as ciphertext devaluation.

While ciphertext devaluation is difficult to quantify, and may be nominal, over time, it is likely to become significant in situations where a key pair is used extensively in its regular life span. Clearly, this scenario is undesirable, and may even be unacceptable under certain certificate policies.

There are currently no proposed solutions to tackle the problem of ciphertext devaluation directly. The two related items of certificate validity periods and certificate revocation provide only indirect support to this issue. Both current options are described below.

Validity Periods

A certificate's validity period was originally intended to solve the problem of ciphertext devaluation by expiring a certificate before an excessive amount of time has passed. The theory here is that a key is subjected to uniform use over time, and therefore a limitation on the lifespan of a key is, by inference, a limitation on ciphertext generated by it. Assuming all certificate subjects generate ciphertext at a roughly constant and equal rate, a validity period will indirectly address the issue of ciphertext devaluation.

When this is the case, the validity period can be set deterministically, since:

$$(\text{Validity\_Period}) = \frac{(\text{Maximum\_Allowable\_Ciphertext})}{(\text{Ciphertext\_Generation\_Rate})}$$

For example:

Maximum Allowable Ciphertext=5000Mb

Ciphertext Generation Rate=8Mb/day

Giving:

$$(\text{Validity\_Period}) = \frac{(5000 \text{ Mb})}{(8 \text{ Mb/Day})} = 625 \text{ Days}$$

While this is a reasonable theory, in practice the amount of ciphertext a given subject will generate is not determined at the time keys are issued. Just as important, no two subjects are likely to generate the same amounts of ciphertext, and are likely to produce spikes and lulls in their output. As a result, actual ciphertext devaluation will not be a consideration in determining the validity of their keys.

To further compound the problem, certificate validity periods are commonly set to a default value for all certificates in a given Certification Authority, and exceptions to this default are rare or non-existent.

This broad-brush method of applying certificates validity periods fails to account for individual nuances. Ultimately, this limits the solutions to a "one size fits all" situation or to manually adjusting every certificate's validity period on issuance. Either way, it solves the ciphertext devaluation problem by accident, if at all.

Revocation

The existing standards also cite revocation as a method for making a valid certificate invalid.

The technical methods for marking a certificate revoked are various, but intent is always the same. Certificates are most commonly revoked when they are known or suspected to have been compromised. Not surprisingly, this is usually a reactive response to a problem, not a proactive solution.

As with validity periods, while revocation can be used to mitigate ciphertext devaluation indirectly, it was not designed for that purpose, and therefore is an incomplete answer.

Thus, unfortunately, there is currently no convention in place for tackling the issue of ciphertext devaluation in an effective or quantitative way.

SUMMARY OF THE INVENTION

Thus the present invention seeks to circumvent or overcome the above mentioned problems of ciphertext devaluation, and provide an alternative way make an otherwise valid certificate invalid, once it is no longer practical to use.

Thus according to one aspect of the present invention there is provided a certificate wherein the certificate validity is determined by the amount of ciphertext associated with it. For example, when the ciphertext associated with the certificate is below a predetermined value, the certificate is valid, and when the ciphertext generated reaches a predetermined value, the certificate is invalid.

Thus, the problem of ciphertext devaluation is overcome by using a ciphertext limited certificate (CLC) for which the certificate validity is dependent on the value of a ciphertext generated index (GCI) determined by the amount of cyphertext generated.

Beneficially, the certificate validity is also dependent on the elapsed time and revocation status, as is conventional. Thus this solution also allows for use of conventional certificate validity functions in concert with a Ciphertext Limited Certificate implementation to ensure that certificates are not used beyond their intended limitations.

For example, under the commonly adopted X.509 standards currently used, ciphertext limited certificates may be implemented by defining and using a Certificate Ciphertext Entitlement (CCE), a Generated Ciphertext Index (GCI), and CCE threshold detection. The CCE is the amount of data that it is permissible for a given certificate to encrypt before it must be rendered invalid, and may be expressed, for example, as a non-critical extension to the X.509 certificate. Thus the extension would be ignored by a system which does not recognize it, but would be accepted only when recognized, to allow for interoperability with existing systems.

Advantageously the CCE is assigned when the certificate is generated, to ensure that it is included in the signed body of the certificate and, for example, different assurance levels may be assigned different CCE default values.

The CCE may be selected so as not to affect the majority of casual users, but to provide heavy or higher assurance users with added protection.

The Generated Ciphertext Index depends on calculating the current count of how much information has been encrypted by the key, the CGI is then compared with the CCE, to determine if a rollover should be performed or not.

Thus, according to another aspect of the invention, there is provided a method of managing ciphertext devaluation in a PKI, comprising: assigning a ciphertext entitlement calculating a generated ciphertext index and performing a certificate ciphertext entitlement threshold detection and when the GCI reaches or exceeds the CCE, causing a key update.

Threshold detection is used to determine if the current key pair should be replaced with a new one.

When the ciphertext generated exceeds a threshold value relative as measured by the GCI, a key update is implemented, e.g. as a rollover of the certificate or by invalidating the certificate. The key update may be implemented as an immediate rollover, or a rollover at next log-in, depending on system and user requirements.

Calculation of the GCI is fundamental to implementation of a ciphertext limited certificate and calculating the generated ciphertext index (GCI) comprises decrypting and verifying the decryption long. When data is decrypted, to avoid double counting data which is decrypted multiple times, a check is done for a unique identifier associated with each ciphertext archive that has been decrypted, and if the unique identifier is found, the GCI is not updated, and when the unique identifier is not found in the decryption long, updating the decryption log and adding the size of the current decrypted data to the GCI. Typically, the unique identifier is the hash of the symmetric key used to encrypt the data, and the decryption long is kept only for ciphertext archives that have been encrypted using the most current key pair.

Advantageously, the GCI is stored in bytes and the GCI is converted into units corresponding to the Certificate ciphertext Entitlement during threshold detection for improved accuracy, and the GCI is contained in the decryption log for faster access during calculations. The GCI may be calculated each time data is decrypted, or at log in only to reduce overhead.

Preferably, the decryption log and GCI are signed and encrypted by the certificate subject.

While there is considerable overhead in calculating the CGI, which necessitates that each time a decryption operation is performed, the decryption log must be decrypted and verified, there are situations where this overhead may be offset by increased security. The decryption log, particularly a time stamped decryption log, would also be a useful source of information for conducting audits, investigations or collecting metrics in some environments.

According to another aspect of the invention there is provided a system for management of certificates for public key infrastructure (PKI), comprising: means for determining a ciphertext entitlement (CCE) means for calculating a generated ciphertext index (CGI) and means for performing a certificate ciphertext entitlement threshold detection and means for causing a key update when the GCI reaches or exceeds the CCE.

Thus Ciphertext Limited Certificates, and systems and methods for managing certificates for PKI dependent on the amount of ciphertext generated, address the above mentioned concerns regarding ciphertext devaluation.

BRIEF DESCRIPTION OF THE DRAWINGS

The invention will now be described in greater detail with reference to the attached drawings wherein.

DETAILED DESCRIPTION OF THE EMBODIMENTS

Figure 1:
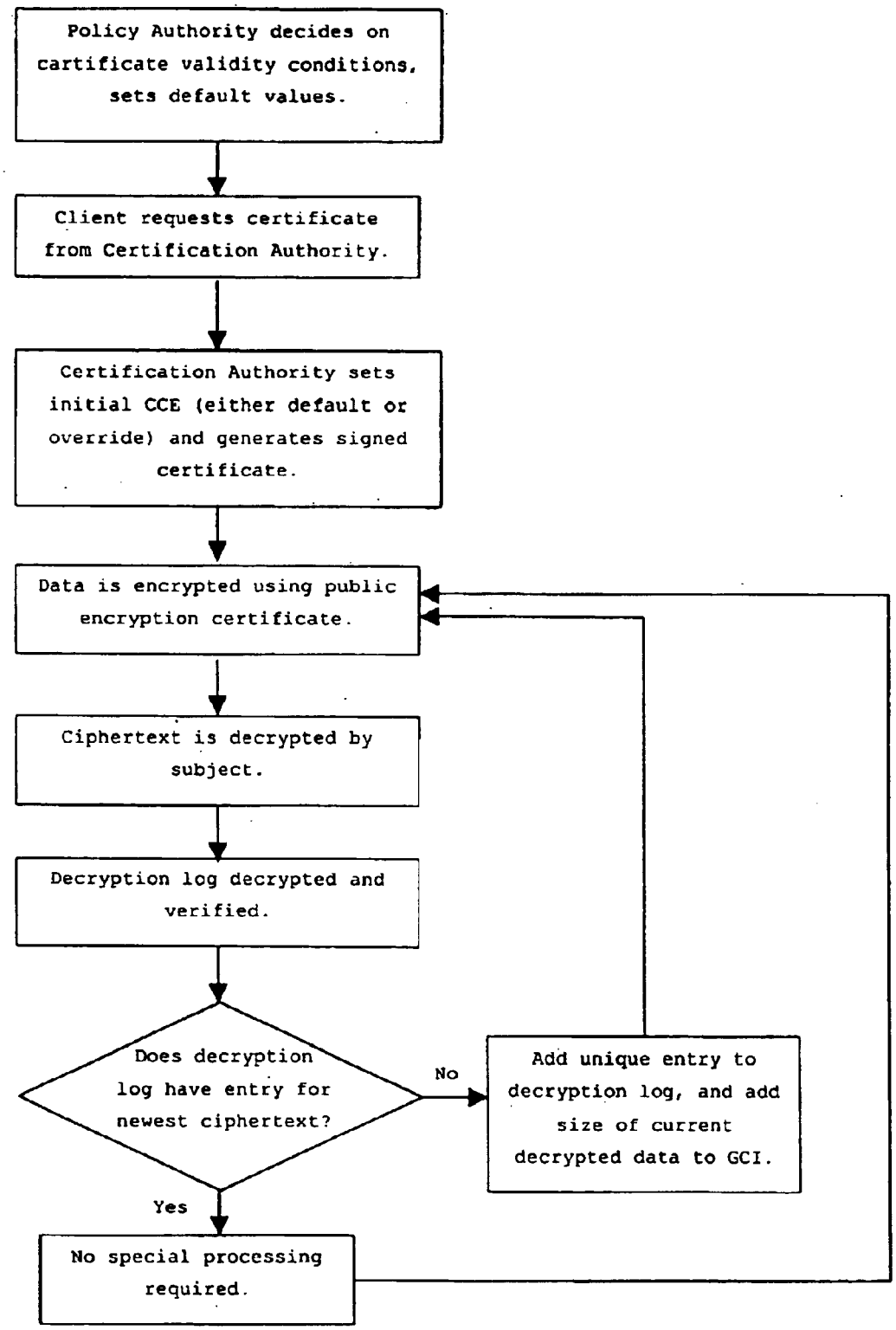
FIG. 1 shows a flow chart representing a method of managing certificates for PKI according to an embodiment of the invention.

As mentioned above, the current known approach to setting the validity of certificates for PKI is dependent on either certificate having a specific validity period or revocation of the certificate. Neither approach effectively takes ciphertext devaluation into account.

A certificate according to an embodiment of the present invention provides that the certificate validity is determined by the amount of ciphertext associated with it. That is, when the ciphertext associated with the certificate is below a predetermined value, the certificate is valid, and when the ciphertext reaches a predetermined value, the certificate becomes invalid. The certificate is thus called a ciphertext limited certificate (CLC), and the certificate validity is dependent on the amount of cyphertext generated.

Providing a system and method for managing a certificate having a validity dependent on the amount of cyphertext generated, for example, as described in more detail the embodiment below, provides a more effective way of managing ciphertext devaluation. This approach provides an alternative way make an otherwise valid certificate invalid, once it is no longer practical to use based on the amount of ciphertext generated.

In general terms, the use of ciphertext limited certificates means that the existing set of conditions governing certificate validity must be extended beyond the existing validity definition.

Existing Validity Definition

Currently, according to known methods and systems the validity of a certificate is set forth by the following conditions:

certificate is being referenced between the "Not Valid Before" and "Not Valid After" times stipulated in the "Validity" extension certificate has not been revoked These conditions can be derived from the following generalized formula:

$$(\text{Certificate\_Validity}) = \frac{k}{(\text{Elapsed\_Time})} \wedge (\text{Revocation\_Status})$$

Where k is a constant value that generally represents the inverse of the assure level of the keys in use. The higher the assure level, the smaller k is, forcing Certificate_Validity to also be smaller. With the exception of Revocation_Status (which is either 0 or 1), other specific values for the above variables are not discussed further in this document.

The following section describes an embodiment of the present invention for Ciphertext Limited Certificates, implemented within the framework of an X.509 based Certification Authority.

While details of this implementation are provided with respect to an X.509 framework, it is intended that implementation is not limited to X.509 and other embodiments may be provided which are adapted to environments other than X.509, as required.

The validity of a certificate according to this embodiment of the present invention is proposed as follows.

The certificate is valid when:

the certificate is being referenced between the "Not Valid Before" and "Not Valid After" times stipulated in the "Validity" extension the certificate has not been revoked and the certificate has not been used to generate more ciphertext than stipulated in a "CertificateCiphertextEntitlement" (CCE) extension Using Ciphertext Limited Certificates, the optimal lifetime of a key is derived as below.

$$(\text{Certificate\_Validity}) =$$

$$\frac{k}{(\text{Ciphertext\_Generated}) + (\text{Elapsed\_Time})} \wedge (\text{Revocation\_Status})$$

where, as described above, k is a constant value that generally represents the inverse of the assurance level of the keys in use. The higher the assurance level, the smaller k is, forcing Certificate_Validity to also be smaller.

The key difference between the embodiment and known validity conditions is the definition of Ciphertext_ Generated. This element represents the amount of ciphertext that a given key pair has generated, and has the effect of reducing Certificate_Validity as it increases. This in turn reduces ciphertext devaluation by invalidating a certificate when the amount of ciphertext associated with it reaches a pre-determined level.

A flow chart representing the implementation of method according to managing ciphertext devaluation in a PKI according to this embodiment is shown in FIG. 1.

Initially, the Policy Authority decides on certificate validity conditions and sets default values including a CCE, in addition to other conditions. The client requests a certificate from the certificate authority. The certificate authority sets the initial CCE, either a default value, or override value, and generates a signed certificate.

Then, data is encrypted using a public encryption certificate, as is conventional. The ciphertext is decrypted by the subject, and in addition, the decryption log is decrypted and verified. The decryption log is analysed to check for an entry for the newest cyphertext. If there is a corresponding entry, no further processing is required. If there is no entry, a unique entry to the decryption log is added, and the size of the current decrypted data is added to the Ciphertext Generated Index (CGI).

Figure 2:
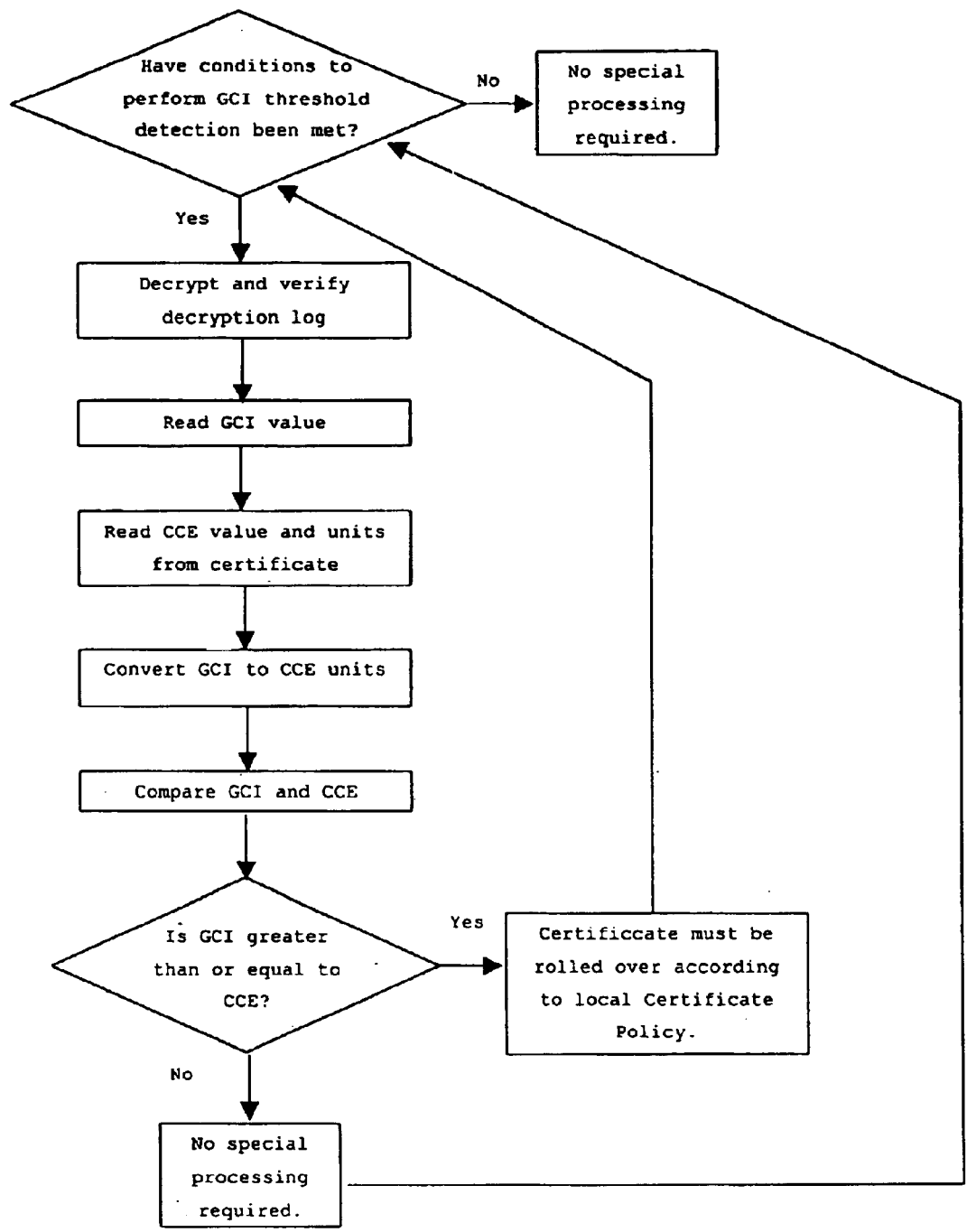
FIG. 2 shows another flow chart representing the steps of evaluation of a certificate's validity for a method according to the embodiment.

As shown in the flow chart of FIG. 2, the steps involved in determining if the GCI has met the threshold are illustrated. If conditions to perform GCI threshold detection have not been met, no additional special processing is required. However, when conditions to perform a GCI threshold detection are met (e.g. this may be at log-in only, or after each decryption of data) the system determines the GCI value, and the CCE value and performs a threshold detection step. That is, the system decrypts and verifies the decryption log, reads the GCI value, and reads the CCE value and units for the certificate, if required converts the GCI to CCE units, and compares the GCI and CCE. When the GCI greater than or equal to the CCE, the certificate is rolled over in accordance with local certificate policy. If the GCI is not greater than CCE, no special processing is required. Thus Ciphertext Limited Certificates are implemented through three elements that combine to form a solution to ciphertext devaluation. The individual components are: Determination of a Certificate Ciphertext Entitlement (CCE); calculation of a Generated Ciphertext Index (GCI): and CCE Threshold Detection.

Each component is discussed in more detail individually below. For the most part, implementation details for one component to not affect other components. This is done to allow each component to be implemented in a manner that best suits each individual environment. While the end result is the same, there may be several alternative paths to get there, and one example is described for each.

CERTIFICATE CIPHERTEXT ENTITLEMENT (CCE)

The Certificate Ciphertext Entitlement, or CCE, is the amount of data that it is permissible for a given certificate to encrypt before it must be rendered invalid.

This is expressed as a non-critical extension to the X.509 certificate standard. As this extension is marked non-critical, it may be safely ignored by systems that do not recognize it. While this provides much greater interoperability, it also means that Ciphertext Limited Certificates will provide no value on systems that do not honour the extension. In this case, conventional methods of rendering a certificate invalid must be relied upon. However, the additional extension will provide for implementation of ciphertext limited certificates in systems set up to use the extension.

The syntax of the certificate extension is as follows:

```
certificateCiphertextEntitlement EXTENSION :: = {
    SYNTAX           CertCipherEntitlementSyntax
    IDENTIFIED BY    id-ce-certificateCiphertextEntitlement }
CertCipherEntitlementSyntax :: = SEQUENCE {
    version          [0]     Version DEFAULT v1,
    entitlementValue [1]     EntitlementValue,
    entitlementUnits [2]     EntitlementUnits }
Version :: = INTEGER { v1(0) }
EntitlementValue :: = INTEGER
EntitlementUnits :: = OBJECT IDENTIFIER
```

As detailed above, the extension consists of three main components. The first indicates the version of Ciphertext Limited Certificates in effect for the certificate. Currently, e.g. v1 is the only valid value for this component.

The second component is the ciphertext entitlement value, which indicates the amount of ciphertext the certificate can encrypt before being rendered invalid.

The third component indicates the units to use for the ciphertext entitlement, and is expressed by using an object identifier. This is related to the ciphertext entitlement value, and designates the unit of measurement to be applied to the value provided.

Object Identifier Assignments

As Object Identifier (OID) assignments are not part of a currently accepted standard, object identifiers selected are proposed by way of example and are subject to change depending of acceptance as a standard.

Certificate Extensions

The following single OID is used to identify a CertificateCiphertextEntitlement extension:

id-ce-certificateCiphertextEntitlement OBJECT IDENTIFIER
    ::=(1.3.6.1.4.1.562.30.1.3.1)

CCE Units

The following list of OIDs are used to identify the unit of measurement to be applied to the EntitlementValue component:

id-ci-megaByte OBJECT IDENTIFIER
    ::=(1.3.6.1.4.1.562.30.1.3.2.1)

id-ci-gigaByte OBJECT IDENTIFIER
    ::=(1.3.6.1.4.1.562.30.1.3.2.2)

id-ci-teraByte OBJECT IDENTIFIER
    ::=(1.3.6.1.4.1.562.30.1.3.2.3)

Assigning CCE

To ensure that it is included in the signed body of the certificate, a CCE must be assigned when the certificate is generated. Were it not signed with the certificate, it would be possible for an untrusted party to alter the CCE for a given certificate, and potentially render it invalid before its time, or worse, allow it to remain valid after it should not be.

CCE is selected much the way that validity periods are. Typically, the policy authority chooses a default value that is used for the majority of certificates issued by a Certification Authority. Different assurance levels are likely to have different CCE default values. Prior to issuance, this default can be overridden for special circumstances.

A carefully chosen CCE will not affect the majority of causal users, but will provide heavy or higher assurance users with added protection.

GENERATED CIPHERTEXT INDEX (GCI)

The generated Ciphertext Index (GCI) contains the current count of how much has been encrypted with a given key. This is compared to the CCE to determine if a rollover should be performed or not.

The GCI is critical to ensuring the success of a Ciphertext Limited Certificate implementation, however there are a number of factors that need to be considered to obtain an accurate GCI.

Calculating GCI

Obtaining an accurate count of the amount of ciphertext associated with a given key pair is a tricky task. Ciphertext can be generated by any entity that has a copy of the public encryption certificate. This means that ciphertext is potentially generated from an unlimited number of sources, at any time, online or offline, without the knowledge or consent of the certificate subject. These factors make the calculation of the accurate GCI difficult, and a practical approach must be taken to obtain a meaningful GCI.

The GCI of a given certificate is also a potentially sensitive piece of information, and should not be made public. Discovering that a particular key pair has a high GCI means that it is protecting a log of information, and is therefore a tempting target. Alternatively, a key pair with a low GCI is most likely a waste of computing power for a potential attacker, and would be avoided.

There is also the problem if GCI inflation, where an attacker generates massive amounts of useless ciphertext for a target. This inflates the subject's GCI and could potentially render an otherwise valid certificate invalid.

This information points strongly to calculating and maintaining CGI on the subject's client side, versus a distributed or infrastructure based solution.

It is presumed that, the holder of the private decryption key will decrypt any ciphertext that is important. Since decryption takes place in the presence of the subject's encryption key pair, and because GCI must ultimately be known on the client side, it makes sense to calculate GCI based on the volume of ciphertext decrypted.

"Double counting" ciphertext that is decrypted multiple times is avoided by keeping a decryption log. The decryption log contains a list of unique identifiers, one for each ciphertext archive that has been decrypted. The unique identifier is simply the hash of the symmetric key used to encrypt that actual data. Note that storing the actual key instead of the hash of the key could potentially expose all ciphertext listed in the decryption log and would not be a good design.

Any time data is decrypted, the decryption log is checked. If the unique identifier for the ciphertext in question is found in the log, the CGI is not updated. If the unique identifier is not found in the log, it is added, and the size of the current decrypted data is added to the GCI.

A decryption log is only kept for ciphertext archives that have been encrypted using the most current key pair. If the archive being decrypted was encrypted using a previous encryption certificate, the decryption log and GCI remain unchanged. This is true even if the previous encryption certificate is still valid, because it has already been superseded.

The GCI is always stored in bytes, regardless of the unit of measurement stipulated in the CCE. Preferably the GCI is converted to the proper units during threshold detection to allow for greater accuracy.

Both the decryption log and the GCI are signed and encrypted by the certificate subject, and therefore decrypted and verified before they are used. Despite this, they are not included as part of the GCI calculation when decrypted. To reduce overhead, the CGI can be contained in the decryption log, reducing the number of cryptographic operations required to access both items.

Incidentally, the decryption log may be a valuable source of information for conducting audits, investigations or collecting metrics in some environments. This value of a decryption log for this purpose is further increased if the decryption log is also time stamped.

CCE THRESHOLD DETECTION

CCE threshold detection is used to determine if the current key pair should be replaced with a new one. If is a simple operation, and consists of checking the GCI against the CCE.

CCE threshold detection must be configurable enough to be performed according to the requirements of each individual environment. That is, some environments may whish to check each time a decryption takes place, while others may only need to check during login. The benefit to checking on login is a lower overhead, however threshold detection can also be done when the decryption log is being updated, meaning there are no additional cryptographic operations (the decryption log is already decrypted and verified).

First, the GCI is decrypted and the digital signature verified. It is then converted to the units stipulated in the CCE certificate extension, and is compared to the CCE value. If the GCI is greater than or equal to the CCE, the current key pair has been used to the full extent of its allowable limits, and should be superseded.

When the client detects that the CCE threshold has been met or exceeded, the client must request a key update (or key rollover) at the next available opportunity. Advantageously, the key update mechanism for certificates entering their transition period should be re-used to maintain consistency and reduce duplication.

The update window may also vary for different environments. In some cases, it may be most appropriate to perform the rollover right away, while others may be better suited to rolling over at the next login. Either way, the update must be queued and performed in a timely manner to remain consistent with the security policy.

Unlike validity periods, it is not appropriate to have a Ciphertext Limited Certificate that "drops dead" at the end of its pre-defined scope.

Once the key update has taken place, the existing decryption log and GCI must be cleared (or archived) to reset the count.

Honouring CCE threshold detection can be viewed in the same light as honouring CRLs. All the required information is collected, maintained and accessible, but in the end, it is up to the PKI client to do the right thing. If threshold detection is not implemented on a particular client, then Ciphertext Limited Certificates will also not be implemented, and therefore there will be no added value.

Ciphertext Limited Certificates have limitations in some applications. Prior to implementing Ciphertext Limited Certificates, some investigation should be conducted to see if it is appropriate and beneficial. Not all environments will find it necessary to use Ciphertext Limited Certificates, and in fact, some may find it detrimental, depending on their requirements.

Some specific limitations of Ciphertext Limited Certificates are outlined below.

One limitation is the additional overhead that a CLC implementation introduces. Each time a decryption operation is performed, the decryption log must be decrypted and verified. This can add a significant overhead when many small files are being decrypted.

It is potentially vulnerable to rollback attacks. An intruder can replace the current decryption log with an older copy of it, causing the GCI to be set back, and the certificate to remain valid longer than intended. Worse the intruder may delete the decryption log all together, setting the GCI back to zero. However, this does require that the intruder have access to the local system of the subject, and if this is the case, the potential for other forms of attacks is far greater than a GCI rollback.

It should be noted that issues may arise when certificates that are used in multiple locations simultaneously, because their GCI will not be calculated correctly. In this case, the first instance of the certificate to reach the GCI threshold will roll over. However, each of the other instances have likely accumulated a GCI count as well, some of which may be form the same data, and some not. Thus, it is difficult to obtain an accurate GCI for certificates that are used in multiple locations. However, use of distributed certificates present issues in other areas of PKI which do currently have a reliable solution, and Ciphertext Limited Certificates are just one more aspect.

The GCI will not be accurate in situations where ciphertext is never decrypted. This is also a protection mechanism, as a subjects certificate cannot be forced to roll over by the actions of a third party (unless the subject decrypts the generated ciphertext). In practice, this should not pose a major problem, as presumably ciphertext that is never decrypted is not highly relevant, and need not be considered in the GCI.

These above mentioned limitations underscore the advantages of using for Ciphertext Limited Certificates as a supplement to existing validity tools rather than a substitute for existing validity conditions. Nevertheless, while Ciphertext Limited Certificates are not going to be appropriate or necessary for every environment, they will undoubtedly add value to many PKI implementations where more effective management of cyphertext devaluation is required.

The need for Ciphertext Limited Certificates will typically arise when the policy authority for an organization determines that current PKI practices do not accurately portray their security requirements.

The technical foundation for implementing Ciphertext Limited Certificates within a known X.509 standards based environment is described above, and it is contemplated that Ciphertext Limited certificates may also be implemented within other frameworks.

In summary, Ciphertext Limited Certificates provide another element with which to manipulate certificate validity. Specifically, they allow the policy authority for an organization to effectively and significantly reduce the problem of ciphertext devaluation by rendering otherwise valid certificates invalid once they have been used to generated a pre-defined amount of ciphertext.

What is claimed is:

1. A certificate for Public Key Infrastructure (PKI), the certificate validity being determined by the amount of ciphertext associated with the certificate, wherein when the amount of ciphertext generated is below a predetermined value, the certificate is valid, and when the amount of ciphertext generated reaches a predetermined value, the certificate is invalid, comprising:

an extension including a Certificate Ciphertext Entitlement (CCE) value defining the amount of data that it is permissible for a certificate to encrypt before it must be rendered invalid;

an object identifier defining the units for ciphertext entitlement; and an associated Ciphertext Generated Index (GCI) defining the count of how much cyphertext has been encrypted by the key, the certificate validity also being dependent on the elapsed time and revocation status wherein the certificate validity is defined by $$(\text{Certificate\_Validity}) = \frac{k}{(\text{Ciphertext\_Generated}) + (\text{Elapsed\_Time})} \wedge (\text{Revocation\_Status})$$

wherein k is a constant value representing the assurance level of the keys in use.

2. A certificate according to claim 1 wherein the extension also defines a version of the Ciphertext limited certificates in effect for the certificate.

3. A certificate according to claim 1 wherein the CCE is expressed as a non-critical extension to a X.509 certificate.

4. A certificate according to claim 1 wherein the CCE included in the signed body of the certificate.

5. A certificate according to claim 3 wherein CCE default values are dependent on assurance level assigned to the certificate.

6. A certificate for a PKI system according to claim 1 compatible with the X.509 standard.

7. A method of managing ciphertext devaluation in a PKI, comprising:

determining a certificate ciphertext entitlement (CCE)

calculating a generated ciphertext index (GCI) wherein calculating the generated ciphertext index (GCI) comprises decrypting and verifying the decryption log performing a certificate ciphertext entitlement threshold detection and when the GCI reaches or exceeds the CCE causing a key update.

8. A method according to claim 7 wherein the key update is implemented as a rollover of the certificate or by invalidating the certificate.

9. A method according to claim 8 wherein the key update is implemented as an immediate rollover.

10. A method according to claim 8 wherein the key update is implemented at next log-in.

11. A method according to claim 7, comprising generating a time stamped decryption log.

12. A method according to claim 7 comprising, when data is decrypted, checking for a unique identifier associated with each ciphertext archive that has been decrypted, and if the unique identifier is found, the GCI is not updated and when the unique identifier is not found in the decryption log, updating the decryption log and adding the size of the current decrypted data to the GCI.

13. A method according to claim 12 wherein the unique identifier is the hash of the symmetric key used to encrypt the data.

14. A method according to claim 13 wherein the decryption log is kept only for ciphertext archives that have been encrypted using the most current key pair.

15. A method according to claim 7 wherein the GCI is stored in bytes and the GCI is converted into units corresponding to the Certificate ciphertext Entitlement during threshold detection.

16. A method according to claim 7 wherein the decryption log and GCI are signed and encrypted by the certificate subject.

17. A method according to claim 7 wherein the GCI is contained in the decryption log.

18. A method according to claim 7 wherein the step of performing a certificate ciphertext entitlement threshold detection is performed each time decryption takes place.

19. A method according to claim 7 wherein the step of performing a certificate ciphertext entitlement threshold detection is performed at log in.

20. A method of managing ciphertext devaluation in a PKI, comprising:

determining a certificate ciphertext entitlement (CCE);

calculating a generated ciphertext index (GCI);

performing a certificate ciphertext entitlement threshold detection and when the GCI reaches or exceeds the CCE, causing a key update, wherein the step of performing a certificate ciphertext entitlement threshold detection comprises decrypting the GCI, verifying the digital signature, converting the GCI to units stipulated in the CCE extension, comparing the GCI to the CCE ad if GCI is greater than or equal to the CCE, requesting a key update in accordance with policy requirements.

21. A method according to claim 20 wherein after the key update has taken place, clearing the existing decryption log and GCI to reset the count.

22. A system for managing ciphertext devaluation in a PKI, comprising:

means for determining a certificate ciphertext entitlement (CCE)

means for calculating a generated ciphertext index (GCI)

means for performing a certificate ciphertext entitlement threshold detection comprising means for decrypting the GCI, verifying the digital signature, converting the GCI to units stipulated in the CCE extension, and comparing the GCI to the CCE and means for causing a key update when the GCI reaches or exceeds the CCE.

23. A computer readable medium for implementing a method of managing ciphertext devaluation in a PKI, comprising:

determining a certificate ciphertext entitlement (CCE)

calculating a generated ciphertext index (GCI) and performing a certificate ciphertext entitlement threshold detection comprising decrypting the GCI, verifying the digital signature, converting the GCI to units stipulated in the CCE extension, and comparing the GCI to the CCE and, when the GCI reaches or exceeds the CCE, causing a key update.

* * * * *